June 2, 1970 R. B. HERMAN ET AL 3,516,023

QUADRATURE MODULATORS

Filed June 19, 1967 2 Sheets-Sheet 1

United States Patent Office 3,516,023

Patented June 2, 1970

3,516,023

QUADRATURE MODULATORS

Ralph Bertrand Herman and William Renwick, Ilford, England, assignors to The Plessey Company Limited, Ilford, England, a British company Filed June 19, 1967, Ser. No. 646,878

Claims priority, application Great Britain, June 21, 1966, 27,621/66

Int. Cl. H03c *1/54*

U.S. Cl. 332—48 3 Claims

ABSTRACT OF THE DISCLOSURE

A modulation system called "Minimum Bandwidth Complementary Channel Amplitude Modulation" (M.B.C.A.M.) which is similar to F.S.K. and which gives a similar or lower error rate for a given signal-to-noise ratio, but which can be contained in a bandwidth of about 1½ times the digit frequency. An arrangement for generating a M.B.C.A.M. signal in which the signal waveform may be considered to correspond to the sum of two amplitude modulated signals, each of minimised bandwidth, and in which the modulating waveforms correspond respectively to the message waveform and to a complementary form of the message waveform, the parameters of said system being arranged so as to minimize the overall bandwidth of the composite signal.

Figure 1:
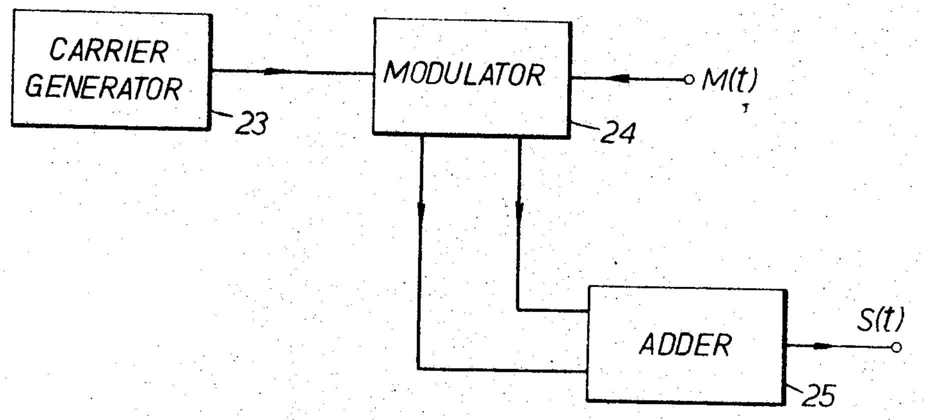

This invention relates to modulation systems for transmitting binary digital message waveforms, and more specifically to a modulation system which has a similarity to frequency shift keying but requires less bandwidth for a given digit transmission rate.

In the present context a binary digital message waveform may be defined as a message waveform which is divisable into equal periods (digit periods) during each of which the waveform has one or other of two fixed values. Each digit period is referred to as either a mark digit or a space digit depending upon which of the two possible values of the message waveform is present. A modulation system is a method of varying one or more parameters of a carrier waveform in a manner dependent on a message waveform so as to produce a modulated signal waveform from which the message waveform may be reconstructed at the receiving terminal.

A well known modulation system for the transmission of binary digital message waveforms is frequency shift keying (F.S.K.). In F.S.K. or the frequency of the modulated signal waveform has one of two possible values during each digit period depending on whether it is a mark digit or a space digit. The difference between the two possible values of the signal frequency is referred to as the peak-to-peak frequency deviation. The other basic modulation systems for binary digital message waveforms are amplitude shift keying (A.S.K.) in which the signal amplitude during each digit period has either the value zero or some fixed finite value, and phase shift keying (P.S.K.) in which the signal phase during each digit period corresponds to a reference phase or to the reverse of this phase.

An important performance characteristic of a modulation system for digital messages is the digit error rate produced at the receiving terminal, for a given signal to noise ratio, when the received signal is perturbed by additive white noise. In order to minimize errors due to this cause in an F.S.K. system, the peak-to-peak frequency deviation should not be less than the digit frequency, and this sets a lower limit to the bandwidth required. However, if the signal amplitude is constant and the frequency transitions are abrupt, an appreciable part of the spectral energy is spread over a frequency band much wider than the digit frequency.

The bandwidth occupied by an F.S.K. signal may be reduced by making each frequency transition occur gradually over a full digit period. Such a modified form of F.S.K. is more accurately described as frequency modulation (F.M.) and most of the spectral energy is then contained in a bandwidth of about 2½ times the digit frequency. By comparison, either A.S.K. or P.S.K., with suitable shaping of the signal waveform in each case, requires a bandwidth of only about 1½ times the digit frequency. In many applications the available bandwidth is limited so that the additional bandwidth required for F.M. as compared with band limited forms of A.S.K. P.S.K. is a serious disadvantage.

According to the present invention there is provided a modulation system comprising carrier generating means, modulation means having first input terminals to which the carrier generating means is connected and second input terminals to which a message waveform is applied, the modulation means being effective for producing a waveform corresponding to the sum of two amplitude modulated signals on different carrier frequencies, each of the said signals being of minimized bandwidth, a first one of said two signals having the message waveform as its modulation and the second of the said two signals having a complementary form of the message waveform as its modulation, the frequency separation and relative phase of the two carriers being such as to result in a composite signal of overall minimized bandwidth.

For reasons which will become apparent hereinafter the system of modulation has been called "Minimum Bandwidth Complementary-Channel Amplitude Modulation" (M.B.C.A.M.) and a system of generating such a signal and of detecting such a signal has been described in our co-pending U.S.A. Pat. application No. 617,443.

In carrying out the invention a quadrature modulator for producing a minimum bandwidth complementary channel amplitude modulated signal may comprise a message function component generator to which is applied a message waveform having a predetermined digit period, and which generates two message function components, multiplying means for multiplying the two message function components respectively by a different one of two carrier signals which are in phase quadrature to one another, and adding means for adding the product from the multiplying means so as to produce the modulated signal, and in which the message function component generator comprises generator means for generating a square wave having a period equal to the digit period of the message waveform, filter means for filtering the square wave so as to produce a sinusoidal waveform corresponding to one of said two message function components, and logic means operable in response to the message waveform, the generated square wave and a signal at the digit period of the message waveform for providing the second of said two message function components.

Figure 2:
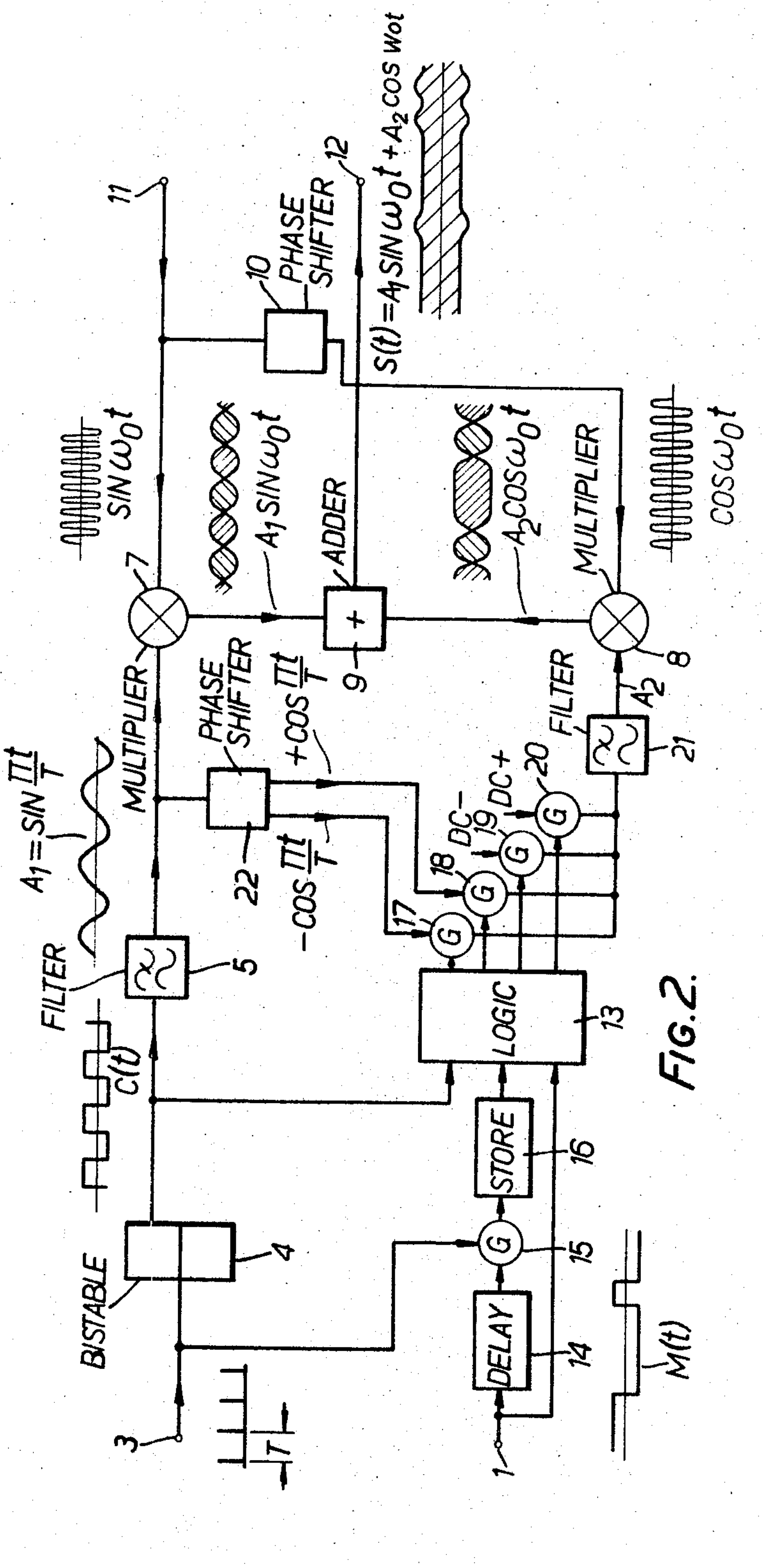

The system of modulation will now be explained by way of a mathematical analysis, and an exemplary embodiment will be described with reference to the accompanying drawings, in which:

FIG. 1 is a block schematic diagram of modulation system according to the present invention, and FIG. 2 is a block schematic diagram showing a method of generating a M.B.C.A.M. signal.

An F.S.K. signal may be regarded as the sum of two A.S.K. signals on separate carrier frequencies spaced from one another by the peak-to-peak frequency deviation, one of these signals being modulated by the message waveform and the other by the complement of the message waveform. The bandwidth may then be reduced by making each amplitude transition of each component A.S.K. signal occur gradually over a digit period. This modified form of F.S.K. is more accurately described as complementary-channel amplitude modulation (C.A.M.). However, the bandwidth required is not significantly less than for F.M.

The next step in the derivation of the M.B.C.A.M. system consists in the application, on each of the complementary channels, of a modified form of amplitude modulation which occupies less bandwidth than normal amplitude modulation. A form of amplitude modulation which meets this requirement and which is capable of non-synchronous detection has been described by Powers in a paper entitled "The Compatibility Problem in Single Sideband Transmission" (Proc. I.R.E., August 1960, pp. 1431–6). It is shown in this paper that the bandwidth of the square of the envelope of a band limited wave is equal to the bandwidth of the wave itself. As a corollary to this theorem, it is therefore impossible to transmit a message in the form of envelope modulation in less than twice the message bandwidth. However, if square law detection is employed, the envelope function may be made equal to the square root of the message function (provided that this is non-negative) and, by suitably modulating the phase of the signal, the bandwidth occupied will be equal to the message bandwidth. The required phase function can be shown to be the Hilbert transform of the logarithm of the envelope function.

The form of amplitude modulation just explained may be described as minimum bandwidth amplitude modulation (M.B.A.M.) and it represents a form of single sideband transmission in which the spectral energy is concentrated in the upper sideband with respect to the carrier frequency. In order to minimize the overall bandwidth occupied when the two complementary channels are combined to produce M.B.C.A.M., and in order to obtain a symmetrical composite spectrum, it is necessary to derive the upper sideband in the case of the channel at the lower carrier frequency and the lower sideband in the case of the channel at the upper carrier frequency. This is achieved by reversing the sign of the phase function in the case of the channel at the upper carrier frequency.

Mathematical expressions corresponding to suitable waveshapes for an M.B.C.A.M. system may be derived as follows.

Let $M_1(t)=\frac{1}{2}[1+M(t)]$ be a non-negative form of digit period T and having the values +1 for a mark digit and −1 for a space digit.

Let $M_1(t)=\frac{1}{2}[1+M(t)]$ be a non-negative form of this message having the values 0 and +1. Let the transitions in $M_1(t)$ be suitably shaped to give a waveform $M_{1S}(t)$ and let this be applied to produce minimum bandwidth amplitude modulation on a carrier signal cos $(\omega_1 t+\varphi_1)$. Let the resultant modulated signal be $S_1(t)$.

Let $M_2(t)=\frac{1}{2}[1-M(t)]$ be a message waveform complementary to $M_1(t)$. Let the transitions in $M_2(t)$ be similarly shaped to produce a waveform $M_{2S}(t)$ and let this be applied to modulate a second carrier signal cos $(\omega_2 t+\varphi 2)$ where $\omega_2/\omega_1$. Let the resultant modulated signal be $S_2(t)$.

The required signal waveform for M.B.C.A.M. may then be expressed as $$S(t)=S_1(t)+S_2(t) \qquad (1)$$

Consider first the case in which $M(t)$ is an all spaces message, giving $$M_1(t)=M_{1S}(t)=0$$

and $$M_2(t)=M_{2S}(t)=1$$

Then the amplitude function relating to $S_1(t)$ is zero so that $S_1(t)=0$.

The amplitude function relating to $S_2(t)$ is $\sqrt{1}=1$. The Hilbert transform of the logarithm of this function is zero and therefore the phase function is zero. Hence $$S_2(t)=\cos\ (\omega_2 t+\varphi 2)$$

Thus in this case $$S(t)=S_1(t)+S_2(t)=\cos\ (\omega_2 t+\varphi 2) \qquad (2)$$

Similarly if we consider the case in which $M(t)$ is an all marks message, we obtain $$M_1(t)=M_{1S}(t)=1$$

$$M_2(t)=M_{2S}(t)=0$$

$$S_1(t)=\cos\ (\omega_1 t+\varphi_1)$$

and $$S_2(t)=0$$

Hence $$S(t)=S_1(t)+S_2(t)=\cos\ (\omega_1 t+\varphi_1) \qquad (3)$$

Finally we consider the case in which $M(t)$ is an alternate markspace waveform. We will assume that each transition in $M_{1S}(t)$ and in $M_{2S}(t)$ is spread over a full digit period and follows a raised cosine law. If the time origin $t=0$ corresponds to the start of a transition from a mark to a space, then $M_{1S}(t)$ is given by $$M_{1S}(t)=\frac{1}{2}\left(1+\cos\frac{\pi t}{T}\right)$$

The amplitude function relating to $S_1(t)$ is therefore $$\sqrt{M_{1S}(t)}=\left|\cos\frac{\pi t}{2T}\right|$$

The logarithm of this amplitude function may be expanded as a Fourier series, i.e.

$$\log\left|\cos\frac{\pi t}{2T}\right|=-\log 2+\cos\frac{\pi t}{T}-\frac{1}{2}\cos\frac{2\pi t}{T}+\frac{1}{3}\cos\frac{3\pi t}{T}$$

The phase function $\theta_1(t)$ relating to $S_1(t)$ is the negative of the Hilbert transform of this series. This is obtained by omitting the constant term and by replacing cosines by negative sines, i.e.

$$\theta_1(t)=-\sin\frac{\pi t}{T}+\frac{1}{2}\sin\frac{2\pi t}{T}-\frac{1}{3}\sin\frac{3\pi t}{T}$$

This series is the expansion of a negative going sawtooth wave of period 2T and corresponds, for $-T<t<T$, to the equation $$\theta_1(t)=-\frac{\pi t}{2T}$$

The phase function is therefore a ramp (constant frequency shift) with phase reversals at the instants when the envelope function is zero. The waveform $S_1(t)$ is therefore given by the equation $$S_1(t)=\cos\frac{\pi t}{2T}\cos\left[\left(\omega_1-\frac{\pi}{2T}\right)t+\varphi_1\right]$$

Similarly the message function $M_{2S}(t)$ is given by $$M_{2S}(t)=\frac{1}{2}\left(1-\cos\frac{\pi t}{T}\right)$$

The amplitude function relating to $S_2(t)$ is therefore $$\sqrt{M_{2S}(t)}=\left|\sin\frac{\pi t}{2T}\right|$$

The phase function $\theta_2(t)$ relating to $S_2(t)$ is given by $$\theta_2(t)=-\sin\frac{\pi t}{T}-\frac{1}{2}\sin\frac{2\pi t}{T}-\sin\frac{3\pi t}{T}$$

This is the expansion of a positive going sawtooth wave of period 2T and corresponds, for $0<t<2T$, to the equation:

$$\theta_2(t)=\frac{\pi t}{2T}-\frac{\pi}{2}$$

Hence $$S_2(t)=\sin\frac{\pi t}{2T}\sin\left[\left(\omega_2+\frac{\pi}{2T}\right)t+\varphi_2\right]$$

Hence $$S(t)=S_1(t)+S_2(t)$$
$$=\cos\frac{\pi t}{2T}\cos\left[\left(\omega_1-\frac{\pi}{2T}\right)t+\varphi_1\right]$$
$$+\sin\frac{\pi t}{2T}\sin\left[\left(\omega_2+\frac{\pi}{2T}\right)t+\varphi_2\right] \quad (4)$$

Similarly, for the alternate mark-space waveform, but with the time origin corresponding to the start of a transition from a space to a mark, we obtain $$S(t)=-\sin\frac{\pi t}{2T}\sin\left[\left(\omega_1-\frac{\pi}{2T}\right)t+\varphi_1\right]$$
$$+\cos\frac{\pi t}{2T}\cos\left[\left(\omega_1+\frac{\pi}{2T}\right)t+\varphi_2\right] \quad (5)$$

If we now choose the peak-to-peak frequency deviation, i.e.

$$\frac{1}{2\pi}(\omega_1-\omega_2)$$

to be equal to the digit frequency, i.e. 1/T, we may make the substitutions $$\omega_1=\omega_0+\frac{\pi}{T}$$

and $$\omega_2=\omega_0-\frac{\pi}{T}$$

where $\omega_0=\frac{1}{2}(\omega_1+\omega_2)$ is an angular frequency centred between $\omega_1$ and $\omega_2$. If we then choose the time origin such that $\varphi=0$, it is found that in order to preserve phase continuity in $S(t)$ for the case of a random message waveform we require $\varphi_1=\pi$. If these substitutions are made in Equations 2, 3, 4, and 5, these equations may be reduced to $$S(t)=\cos\left[\left(\omega_0-\frac{\pi}{T}\right)t\right] \quad (6)$$

for an all spaces message $$S(t)=-\cos\left[\left(\omega_0+\frac{\pi}{T}\right)t\right] \quad (7)$$

for an all marks message $$S(t)=\sin\frac{\pi t}{T}\sin\omega_0 t\pm\cos\omega_0 t \quad (8)$$

for an all transitions message.

The above waveforms are most conveniently generated, to a good approximation, by a form of quadrature modulator as described in our U.S.A. Pat. application No. 617,443. The quadrature components of $S(t)$, correspnding to the waveforms of Equations 6, 7 and 8 are given by $$S(t)=A_1\sin\omega_0 t+A_2\cos\omega_0 t \quad (9)$$

where $$A_1=\sin\frac{\pi t}{T};\ A_2=\cos\frac{\pi t}{T} \quad (10)$$

for a space digit preceded by a space $$A_1=\sin\frac{\pi t}{T};\ A_2=-\cos\frac{\pi t}{T} \quad (11)$$

for a mark digit preceded by a mark $$A_1=\sin\frac{\pi t}{T};\ A_2=\pm 1 \quad (12)$$

for a transition, the sign of $A_2$ being selected to preserve continuity in the waveform $A_2$.

A block schematic diagram showing a modulation system for carrying into effect the present invention as set forth above is shown in FIG. 1 of the accompanying drawings. In this figure a carrier signal generator 23 has its output connected to a modulator 24 which is capable of generating in response to a received message waveform $M(t)$, the two quadrature components $A_1 \sin \omega_0 t$ and $A_2 \cos \omega_0 t$ of the waveform $S(t)$ where $A_1$ and $A_2$ are given by Equations 10–12. As will be apparent from the foregoing mathematical analysis of the modulation system the addition of the two quadrature components performed by adder circuit 25 in the drawing, results in the production of a composite signal $S(t)$ of overall minimised bandwith.

Turning now to FIG. 2 of the drawings, the block schematic diagram shown is a gradrature modulator for producing a M.B.C.A.M. signal and which utilises the principle set forth in our co-pending U.S.A. Pat. application No. 617,443. It is basically similar to the quadrature modulator described with reference to FIG. 4 therein except that the generation of the message function component $A_2$ is performed by means of a logical network which selects appropriate time segments of a positive or negative D.C. level or a positive or negative cosine wave at half the digit frequency. The circuits shown generally in block form are typical of those in common use and so will not be described individually and for convenience these circuits which are common to both modulators will be afforded the same designations. In the quadrature modulator shown in the accompanying drawing a message waveform $M(t)$ is applied to terminal 1, and a source of pulses at the digit frequency of the message is connected to terminal 3. The digit pulses operate a bistable 4, so as to produce at its output a clock wave $C(t)$ which has the form of a rectangular wave, the period of which is twice the digit period. The clock wave is connected to a low pass (or band pass) filter 5, the cut-off frequency of which is such as to pass only the fundamental component of the clock wave. The output from filter 5 is therefore a sinusoidal waveform at half the digit frequency and corresponds to the required message function component, $$A_1=\sin\frac{\pi t}{T}$$

The message waveform $M(t)$ is applied to a logic circuit 13 which has three input connections and four output connections. It is also applied to a delay circuit 14 (which may comprise a resistor and a capacitor) which delays the message by an arbitrary fraction of a digit period. The output from the delay circuit is sampled during each digit pulse by means of a gate 15, the output from which is connected to a store 16, consisting of a bistable circuit. The output from the store is a reconstruction of the message waveform, but delayed by one digit period, and this provides the second input to the logic circuit 13. The third input to the logic circuit is the clock wave $C(t)$. The four outputs from the logic circuit are connected respectively to four gates 17, 18, 19 and 20. The logic is such that, during any digit period, one and only one of the four output connections are energized, depending on the signs of the message waveform, the delayed message waveform, and the clock waveform, and this causes the corresponding gate to be opened. The output from the filter 5 is connected to a phase shifting circuit 22 which has a balanced output, giving a negative and a positive cosine wave at half the digit frequency. These waveforms provide the second input to the gates 17 and 18 respectively. Gates 19 and 20 receive respectively as second input a negative and a positive D.C. level of unit value. The outputs from the gates 17, 18, 19 and 20 are joined, giving a waveform at the junction point corresponding to the message function component $A_2$ as defined by Equations 10, 11 and 12. This is passed through the low pass filter 21, the purpose of which is to remove any transient spikes which might result from the finite switching times of the gates or any other timing inaccuracies. The message function $A_1$ (from the output of filter 5) and the message function $A_2$ (from the output of filter 21) are applied respectively to input terminals of the multipliers 7 and 8. A carrier waveform $\sin \omega_0 t$ is applied to terminal 11 and is connected to the second input terminal of multiplier 7. This carrier waveform is also shifted in phase through an angle of $\pi/2$ radians by means of phase shifter 10 to give a second carrier waveform of $\cos \omega_0 t$ at the same frequency but in phase quadrature with the first. The phase shifted carrier waveform provides a second input to multiplier 8. Multipliers 7 and 8 generate output waveforms $A_1 \sin \omega_0 t$ and $A_2 \cos \omega_0 t$ respectively and these are added together in adder 9. The output from adder 9 consists of the required modulated waveform $S(t)$ as given in Equation 9.

The M.B.C.A.M. signal waveform may be non-synchronously detected by any conventional type of frequency discriminator. It may alternatively be synchronously detected by a form of quadrature demodulator as described in our above-mentioned co-pending patent application.

In the case of a random message waveform the quadrature component $A_2 \cos \omega_0 t$, as generated in the quadrature modulator, corresponds to a carrier signal $\cos \omega_0 t$ which is subject to balanced amplitude modulation by a modified, but still random, message waveform which is band limited. The bandwidth of the spectrum corresponding to this component is therefore similar to that of a band limited A.S.K. or P.S.K. signal at the same digit rate, and may be taken as about 1½ times the digit frequency. The quadrature component $A_1 \sin \omega_0 t$ is independent of the message waveform and has a spectrum consisting of only two lines spaced below and above the carrier frequency $\omega_0/2\pi$ by half the digit frequency. Hence the presence of this quadrature component does not augment the total bandwidth required.

Theoretical computations have been made for the error rate of an M.B.C.A.M. system as described above, as a function of the normalized signal to noise ratio i.e. the average signal energy per digit divided by the noise power density. A random message waveform was assumed, and the type of receiving system assumed was that comprising a bandpass filter followed by a limiter followed by a discriminator, but with no post-discriminator. The results have been compared with the theoretical performance for F.S.K. with optimized non-synchronous detection and with no signal bandwidth limitation. The comparison indicates that the performance for M.B.C.A.M. is approximately the same as for F.S.K. at low error rates (less than 1 in $10^4$) improving to an advantage compared with F.S.K. of 1.5 db or more at high error rates (above 1 in 10). Since the type of receiving system assumed in the analysis is probably not the optimum for non-synchronous detection, the possible improvement compared with F.S.K. is probably greater than the above figures indicate. Therefore the system according to the present invention gives an improved performance compared with F.S.K. as well as a saving in bandwidth.

What we claim is:

1. A quadrature modulator for producing a minimum bandwidth complementary channel amplitude modulated signal comprising a message function component generator to which is applied a message waveform having a predetermined digit period, and which generates two message function components, multiplying means for multiplying the two message function components respectively, by a different one of two carrier signal which are in phase quadrature to one another, and adding means for adding the products from the multiplying means so as to produce the modulated signal, and in which the message function component generator comprises generator means for generating a square wave having a period equal to twice the digit period of the message waveform, filter means for filtering the square wave so as to produce a sinusoidal waveform corresponding to one of said two message function components and logic means operable in response to the message waveform, the generated square wave and a signal having a period equal to the digit period of the message waveform for providing the second of said two message function components.

2. A quadrature modulator according to claim 1, in which the logic means comprises delay means for delaying the message waveform, gate means for gating the delayed output at intervals determined by the signal having a period equal to the digit period of the message waveform, store means for storing the gated signal, logic selection means effective in response to the gated signal, the message waveform and the generated square wave for selecting one of a number of discrete signals, and filter means for filtering the selected discrete signal to afford the second of the two message function components.

3. A quadrature modulator according to claim 2, comprising phase shifting means to which the first of the two message function components is applied, the phase shifting means being effective for producing two anti-phase signals constituting two of the number of discrete signals, which are in phase quadrature with the first message function component and in which two further discrete signals are afforded by respective positive and negative voltage sources.

References Cited

UNITED STATES PATENTS

| | | | |
|---|---|---|---|
| 3,229,230 | 1/1966 | Feldman. | |
| 3,243,731 | 3/1966 | Erickson. | |
| 3,281,673 | 10/1966 | Richardson | 307—232 X |
| 3,296,525 | 1/1967 | Sakuma | 307—232 X |
| 3,320,552 | 5/1967 | Glasser | 332—43 X |

ALFRED L. BRODY, Primary Examiner

U.S. Cl. X.R.

307—232; 325—30, 163; 328—159, 104, 151; 332—11